(No Model.)
L. MILLER.
HARVESTER BUTTER AND APRON BELT OR CARRIER.
No. 329,062. Patented Oct. 27, 1885.
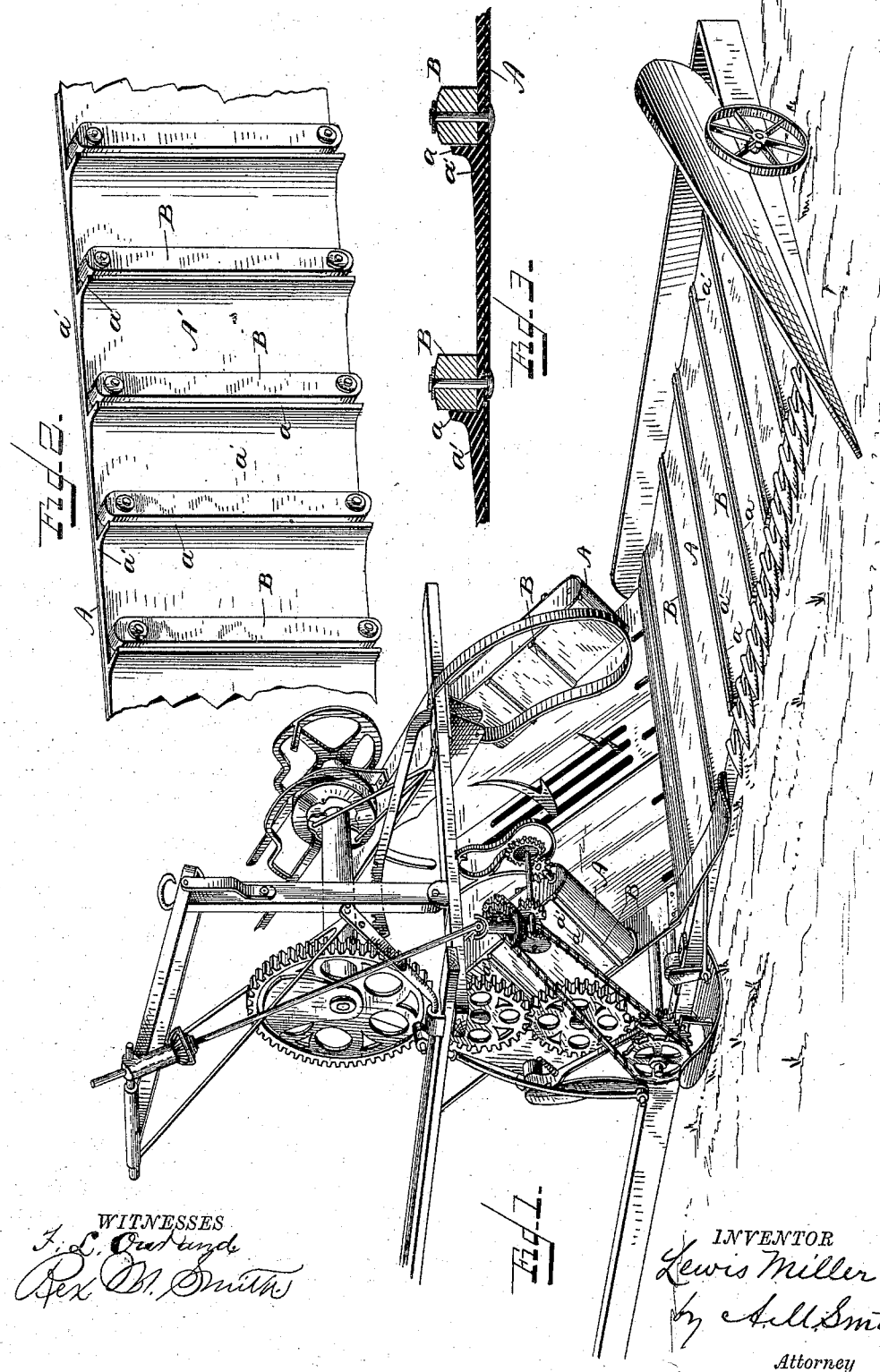

UNITED STATES PATENT OFFICE.

LEWIS MILLER, OF AKRON, OHIO.

HARVESTER-BUTTER AND APRON BELT OR CARRIER.

SPECIFICATION forming part of Letters Patent No. 329,062, dated October 27, 1885.

Application filed July 5, 1884. Serial No. 136,883. (No model.)

*To all whom it may concern:*

Be it known that I, LEWIS MILLER, of Akron, county of Summit, and State of Ohio, have invented a new and useful Improvement in Harvester-Butters and Apron Belts or Carriers, of which the following is a full, clear, and exact description, reference being had to the accompanying drawings, making part of this specification.

My invention relates to a novel construction of the slatted endless carrier or butter apron or belt whereby the straw is prevented from becoming caught in between the slats and the apron, and thereby caused to be carried around by said apron or belt on its return movement through the inoperative portion of its path; and it consists in the combination, with an endless belt or apron composed of rubber or cotton, or other suitable fabric faced with rubber or rubber fabric, of suitable lugs, or slats, or rubber either alone or supplemented on their rear faces relatively to the movement of the belt or apron, with slats of wood or other suitable material secured to the apron or belt in any usual or preferred manner, the lugs or rubber ribs standing up in front of and covering the joints between the apron and the slats, and so preventing the straw from getting between them.

It further consists in making the rubber portion of the belt or carrier-apron thicker and with a forward taper in front ef the lug or slat where the principal wear and strain comes upon it, thereby adapting it to receive such wear and strain without materially increasing the weight of the belt.

In the accompanying drawings, Figure 1 is a perspective view of a harvesting-machine with my improvements applied; Fig. 2, a perspective view of a portion of the carrier-belt, and Fig. 3 a section through a portion of the same.

In the use of the butter-belts as ordinarily constructed much difficulty has been experienced from the wedging of the butts of the straw acted upon thereby in between the belt and the slats in such a manner as to cause the straw to be grasped or held and carried around by the belt in its return movement through the inoperative portion of its path. Where straw has thus once effected an entrance between the slat and belt the action of other straw upon it causes such straw to further wedge the slat and belt apart, and thus to afford room for the entrance of additional straw until, finally, the movement of the belt is stopped by it, or the belt and slats are wedged apart and the butter destroyed. In such belts or endless aprons also the wear comes principally upon the belt just inside of the slats, by means of which a positive forward movement is imparted to the butts or straw, and as ordinarily constructed the belts soon wear out at these points, making it necessary to replace them with new ones, while the belts at all other points are practically as good as new.

To remedy these difficulties I form upon or secure to the rubber facing A' of the belting or canvas A a series of lugs or transverse ribs of rubber, *a*, having their rear faces adjacent to the slats B, perpendicular or thereabout to the face of the belt or apron, and with the forward face or edge of the slats resting snugly against them, as shown. These ribs *a* may be formed with the rubber or rubber fabric, or the latter may be formed without the lugs or ribs in the usual manner, and the ribs in the form of suitable strips secured to the face of the belt by being vulcanized thereon, so as to practically constitute them one with the belt. They are of sufficient height to cover and protect the joint between the slats and the belt, and to effectually prevent the entrance of the butts or straw between said parts; or, if desired, they may be made of sufficient thickness and rigidity to form the slats of the apron or belt without the aid of the wooden slats usually employed. Where the wooden slats are used, they may be secured to the belt A in any usual or preferred manner just behind and abutting against the ribs or lugs *a*, as explained. I also give to the rubber facing of the belt a tapering form in front of the ribs or slats, where the principal wear or strain comes, as shown at *a'*, giving to the portion of the apron or belt just in front of the rib or slat a wedge form, with the base of the wedge resting against or terminating at the forward face of the slat, as shown in Fig. 3. This construction, by giving increased thickness to the rubber at its junction with the slat, greatly increases the durability of the apron or belt without materially increasing the weight. These wedge portions may be formed in one with the apron-surface or with the ribs $a$, and vulcanized upon the face of the belt, and where the wood slats are employed they may be of sufficient thickness at their base or rear edges to protect the joints between the slats and belt without the aid of a distinct rib portion, $a$.

Having now described my invention, I claim as new—

1. The endless butter or carrier apron, of india-rubber or rubber-surfaced fabric, in combination with transverse ribs or lugs of similar material, formed upon or applied to the surface thereof, substantially as and for the purpose described.

2. The combination, with the endless butter or carrier belt or apron, of the transverse rubber ribs or lugs formed upon or applied thereto, substantially as described, and the slats secured to said belt or apron in rear of said ribs or lugs, substantially as described.

3. The combination, with the endless belt or apron of rubber or rubber fabric, of the transverse slats and the wedge-shaped or thickened and tapering facings or portions of rubber in front of said slats, substantially as and for the purpose described.

4. The combination, in an endless butter-belt or carrier-apron, of the rubber wearing-surface, the transverse ribs or slats, and the thickened wedge-shaped portions in front of said ribs or slats, substantially as described.

In testimony whereof I have hereunto set my hand this 2d day of July, A. D. 1884.

LEWIS MILLER.

Witnesses:
O. L. SADLER,
CHAS. W. CRANKSHAW.